Figures 1, 2:
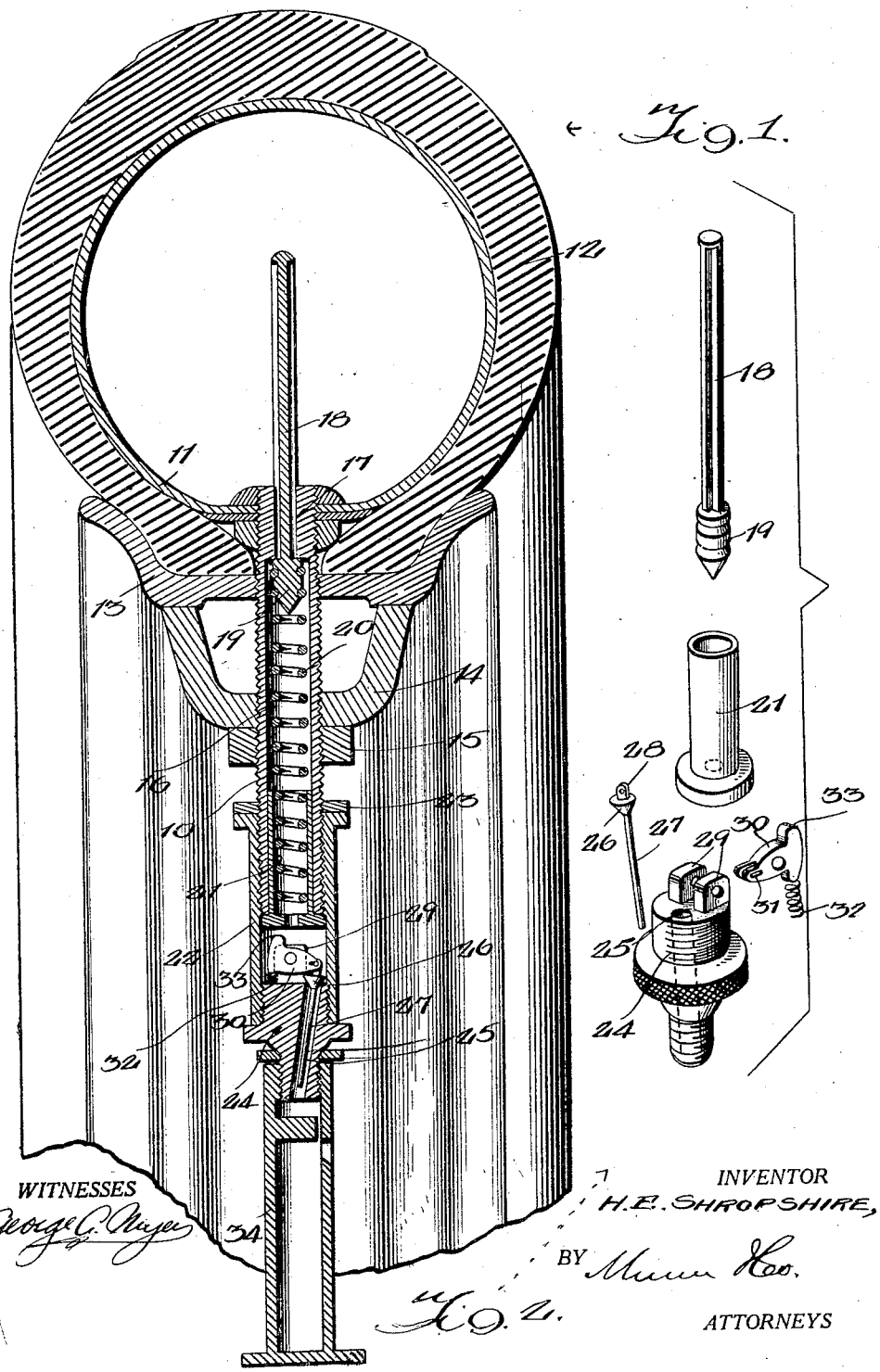

June 17, 1924.

H. E. SHROPSHIRE

FLAT TIRE SIGNAL

Filed Aug. 24, 1923

1,498,306

WITNESSES

INVENTOR
H. E. SHROPSHIRE,
BY
ATTORNEYS

Patented June 17, 1924.

1,498,306

UNITED STATES PATENT OFFICE.

HENRY E. SHROPSHIRE, OF SAN BERNARDINO, CALIFORNIA.

FLAT-TIRE SIGNAL.

Application filed August 24, 1923. Serial No. 659,204.

*To all whom it may concern:*

Be it known that I, HENRY E. SHROPSHIRE, a citizen of the United States, and a resident of San Bernardino, in the county of San Bernardino and State of California, have invented certain new and useful Improvements in Flat-Tire Signals, of which the following is a specification.

My present invention relates generally to flat tire signals for automobiles and more particularly to a mechanically actuated and controlled device where in the sounding of the signal is accomplished by means of pressure remaining within the tire, the mechanical parts being actuated before the tire is actually flat and its entire volume of air exhausted.

In the accompanying drawing which illustrates my present invention and forms a part of this specification, Figure 1 is a sectional view taken longitudinally through my improved alarm and showing the same applied, and Figure 2 is a detail perspective view of certain of the parts thereof in detached relation.

Referring now to these figures I have shown in Figure 1 a valve tube 10 attached at its inner end to the inner tube 11 within a pneumatic tire casing 12, the valve tube passing through a rim 13 and wheel felly 14 the latter of which is normally locked by a lock nut 15. This tube 10 has an enlarged cylindrical bore 16 extending therein from its outer end and for the major portion of its length and in communication with a smaller axial opening 17 through its inner portion and its inner end, the opening 17 receiving a feeler stem 18 whose inner end projects substantially within the inner tube 11 and whose outer headed end 19 is disposed within the inner portion of the bore 16 of the valve tube and is engaged by a spring 20 of just sufficient strength to hold the feeler stem 18 in place against accidental sliding movement.

The outer end of the spring 20 extends within and against a valve actuating sleeve 21 having a frictional fit within the outer end of the bore 16 of the valve tube so that it will remain in place unaffected by the spring 20 under normal conditions and will be shifted outwardly upon engagement thereof by the head 19 of the feeler stem 18 when the latter is shifted outwardly in case of a sufficiently flattened condition of the tire casing 12.

Threaded on the valve tube 10 around its outer end is a tubular valve holding sleeve 22 which may be held in place by a lock nut 23, and the outer portion of which is internally threaded to receive a valve plug 24 having lengthwise therethrough an opening 25 normally closed by a valve 26 which has a guide stem 27 extending into the opening and which seats in an outward direction within the inner end of the opening and has an apertured lug 28 at its inner end.

Fulcrumed between inwardly projecting ears 29 of the valve plug 24 is a valve opening lever 30 having at one end slots 31 in which is movably disposed a pin extending through the lug 28 of the valve 26 and whose opposite end is engaged at one side by a spring 32 tending to normally hold the valve 26 against its seat, this latter end of the lever 30 having at its opposite side a projection 33 opposing the outer end of the actuating sleeve 21 so that when the latter is thrust outwardly upon contact therewith of the feeler head 19, the sleeve 21 will upon engagement with the lever projection 30 lock the lever on its fulcrum and open the valve 26 so that pressure still remaining within the inner tube 11 can find its way through the valve plug opening 25.

Threaded to the outer portion of the valve plug 24 is a whistle tube 34, and the pressure when permitted to pass the valve 26 will thus actuate the whistle and sound an alarm so that the owner will thus be warned that the tire is rapidly becoming flat even before this actually takes place so as to avoid danger of running with a flat tire and in this way bruising the side walls of the casing 12 as well as pinching and cutting the sides of the inner tube 11.

It will be noted from Figure 2 in particular that in order to permit of the passage of air through the opening 17 at the inner end of the valve tube, the feeler stem 18 is ribbed and it is obvious that my invention thus provides a simple effective tire signal which may be readily installed, which will be effective and efficient in use and is strong and durable.

I claim:

1. In a flat tire signal, a valve tube, a stem axially shiftable in the tube and normally projecting through and beyond its inner end for movement outwardly upon partial deflation of the tire, a spring normally holding the said stem against movement, a valve holder at the outer end of the stem, a valve normally seated outwardly within said holder to prevent escape of pressure, a presure actuated signal member outwardly beyond said valve, and mechanical means for unseating the valve located within the tube inwardly beyond the valve and actuated by the said stem when the latter is forced in the direction of its length outwardly through the valve tube as the tire is in course of deflation.

2. In a flat tire alarm, a valve tube having at its inner end a lengthwise shiftable stem normally projecting beyond the end of the tube and having at its outer end a movable actuating member engageable by said stem, a spring within the tube normally controlling said stem a valve holding sleeve around the outer end of the stem, a valve plug disposed in the sleeve and having a lengthwise opening and a valve seated outwardly within the inner end of said opening, a valve opening lever having engagement with the valve and disposed adjacent to and in the path of movement of said valve actuating member, and a pressure actuated alarm member attached to the valve plug.

HENRY E. SHROPSHIRE.